Nov. 19, 1946.                M. WATTER                 2,411,484
                          AIR SPEED INDICATOR
                          Filed June 9, 1944                2 Sheets-Sheet 1
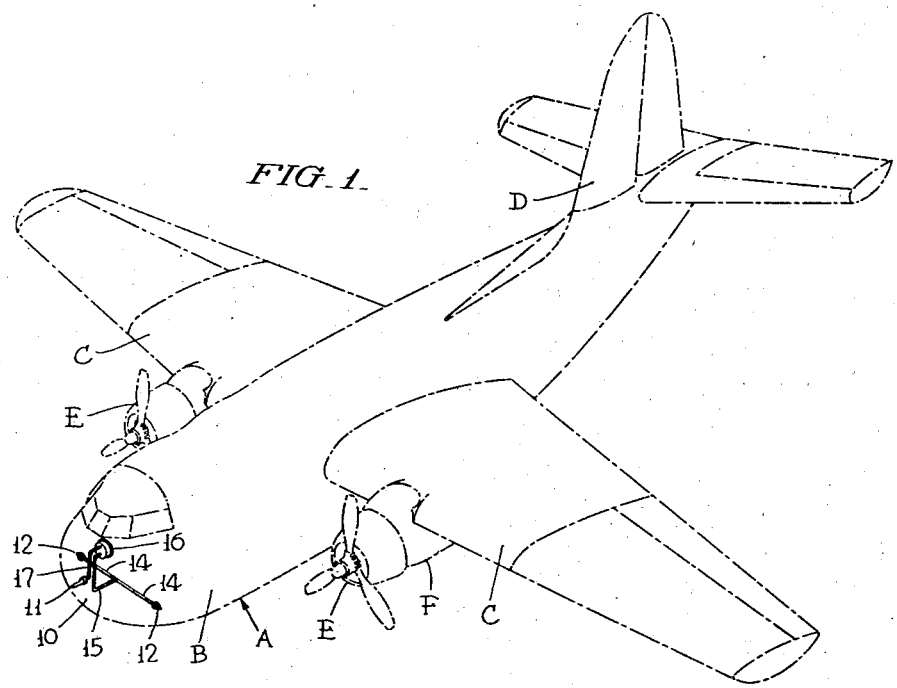
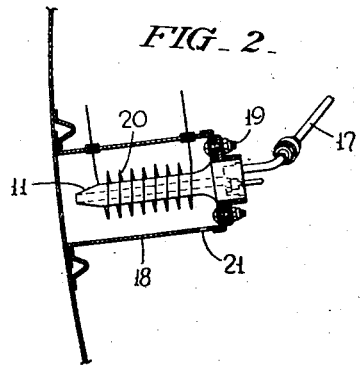
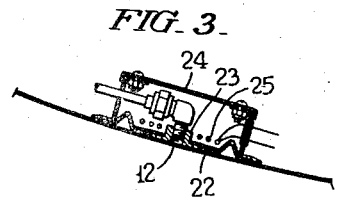
INVENTOR
Michael Watter,
BY John P. Tarbox
ATTORNEY Patented Nov. 19, 1946

2,411,484

UNITED STATES PATENT OFFICE 2,411,484

AIR SPEED INDICATOR

Michael Watter, Philadelphia, Pa., assignor to The Budd Company, Philadelphia, Pa., a corporation of Pennsylvania Application June 9, 1944, Serial No. 539,437

3 Claims. (Cl. 73—182)

This invention relates to airspeed indicators, as for use on aircraft and the like, and has for an object the provision of improvements in this art.

One of the particular objects is to provide an air speed indicator which does not impose parasitic drag on the vehicle on which it is mounted.

Another object is to provide ready access to all parts of the apparatus at all times.

Another object is to cancel out the effects of side currents and turns.

Other objects and advantages will be apparent from the following description of illustrative embodiments thereof, reference being made to the accompanying drawings, wherein:

Fig. 1 is a perspective view of an airplane equipped with this airspeed indicator;

Fig. 2 is an enlarged section through the dynamic head or Pitot tube;

Fig. 3 is an enlarged section through the static head;

Figure 4:
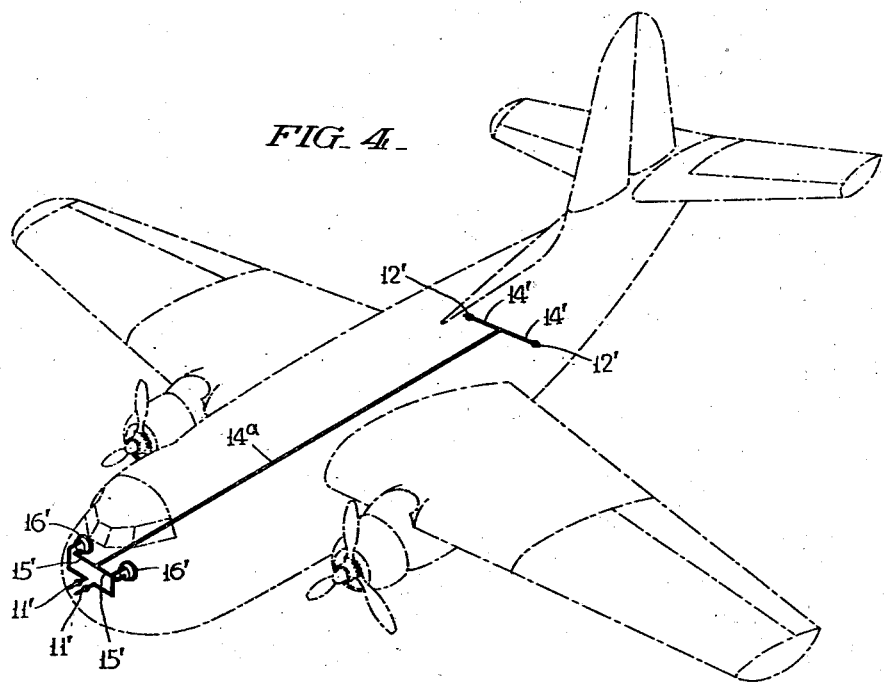
Fig. 4 is a perspective view of a modification.

Referring to the drawings, the vehicle here shown is an airplane A, including fuselage B, wings C, empennage D, and outboard motors E mounted on nacelles F. The nose 10 of the fuselage is free of the propeller slipstream and when a dynamic Pitot tube head 11 is placed in the nose, it directly and correctly registers changes in airspeed unaffected by extraneous influences, the nose of the body acting in effect as a part of the Pitot tube and the air flowing away from the tube head in all directions. Heretofore, it has been proposed to place a dynamic tube head in the leading edge of the wings or other sustentation airfoil but the narrow edge is affected too much by shifting currents and climb angle changes to furnish accurate indications. Other installations have placed the dynamic and static tube heads on a pedestal or outboard projection on either the body or sustentation airfoils but this imposed undesired parasitic drag on the airplane.

The static tube head 12 is placed on the side of the body in a position where the air flow is predominantly tangential and unaffected by dynamic pressure or eddy currents. In Fig. 1 it is placed on the rounded side of the nose, the optimum point being determined by wind tunnel tests or experiment for each particular craft. It is to be noted that there is a static tube head 12 on each side of the body and that both are connected by tubes 14 to a common tube 15 which leads to the airspeed indicator instrument 16 in the pilot's compartment, thus canceling the effects of cross currents and turns. The dynamic head 11 is connected to the instrument 16 by a tube 17.

As shown in Fig. 2, the dynamic head 11 is located in a recess 18 in the nose and is removably secured therein as by screws or bolts 19 in the base. A heating coil 20, interior or exterior of the external tube, is provided to prevent icing over. A drain 21 may be provided for removing water, if needed.

As shown in Fig. 3, the static head 12 is formed as a hole in a reinforced patch 22 on the nose skin sheet, together with a mating apertured nipple fitting plate 23 secured thereto. Pipe fittings, including a union, and a removable box cover 24 provide access to the outer aperture in the skin for cleaning when necessary. Heating means 25 located adjacent the outer skin serves to prevent ice forming over the aperture, though at this location the danger of icing is much less than at the nose.

Figure 5:
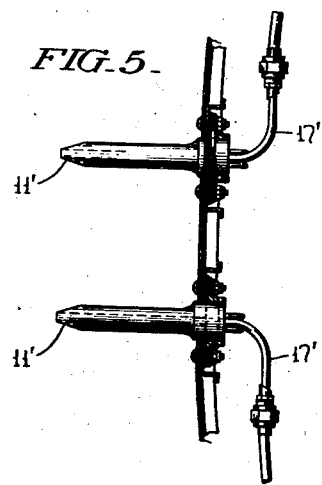
Fig. 5 is a horizontal section through the body nose of Fig. 4 showing dual instrument tubes.

As shown in Figs. 4 and 5, the Pitot tubes 11' for registering dynamic pressure may extend a short distance beyond the nose instead of being recessed into the nose as in Fig. 2. Two such Pitot tubes 11' are shown in the nose, one for each instrument 16' of dual controls for pilot and co-pilot. Also the static tube heads 12' are located on the body behind the wings where another optimum location is found. The two static heads on opposite sides connect by tubes 14' to a common tube or manifold 14a which connects by tubes 15' with the instruments 16'. Thus while the dynamic heads serve each instrument separately, the static heads serve both instruments in common.

The axis of the dynamic tube is inclined downwardly toward the front end, here about 9°, relative to the fuselage axis.

The bulbous front end of the fuselage is so deep vertically and so wide horizontally that the mid-portion is substantially unaffected by air disturbances, hence the mid-portion of the front end of the fuselage provides a good location for the dynamic head of the air speed indicator, as distinguished from a location on the front edge of a wing which is relatively thin vertically and where changes in the angle of attack greatly change the air conditions for a static head which may be there located.

It is thus seen that the invention provides accurate and accessible means for registering the airspeed; also that the minimum parasitic drag is imposed; and further that the effects of side currents and turns are eliminated.

While certain embodiments of the invention have been described, it is to be understood that there may be various embodiments within the limits of the prior art and the scope of the subjoined claims.

What is claimed is:

1. In an airplane having a fuselage which at the front end is so deep vertically as to be substantially unaffected by air disturbances such as those which affect the leading edge of a wing with changes in the angle of attack, and which front end is disposed clear of the propeller stream, the combination therewith of a dynamic head located near the mid-height of the front end of the fuselage, a static head located in each side of the fuselage, a pressure differential indicating instrument located in said fuselage, and means for conveying effects of air pressure from said dynamic and static heads to said instrument.

2. In an airplane having a fuselage which at the front end is so deep vertically as to be substantially unaffected by air disturbances such as those which affect the leading edge of a wing with changes in the angle of attack, and which front end is disposed clear of the propeller stream, the combination therewith of a dynamic head located near the mid-height of the front end of the fuselage, a static head located in each side of the fuselage, a pressure differential indicating instrument located in said fuselage, and means for conveying effects of air pressure from said dynamic and static heads to said instrument, all of said heads being attached to the shell of the fuselage and being removable toward the inside of the shell.

3. In an airplane having a fuselage which at the front end is so deep vertically as to be substantially unaffected by air disturbances such as those which affect the leading edge of a wing with changes in the angle of attack, and which front end is disposed clear of the propeller stream, the combination therewith of a dynamic head located near the mid-height of the front end of the fuselage, a static head located in each side of the fuselage, a pressure differential indicating instrument located in said fuselage, and means for conveying effects of air pressure from said dynamic and static heads to said instrument, said heads being located wholly within the airfoil surface of the shell of said fuselage.

MICHAEL WATTER.